(12) United States Patent
Nishiyama et al.

(10) Patent No.: US 7,604,409 B2
(45) Date of Patent: Oct. 20, 2009

(54) HYDRODYNAMIC BEARING MEMBER AND MANUFACTURING METHOD THEREOF

(75) Inventors: Hiroshi Nishiyama, Ehime (JP);
Hiroyuki Kiriyama, Ehime (JP);
Makoto Hasegawa, Tottori (JP)

(73) Assignee: Panasonic Corporation, Osaka (JP)

( * ) Notice: Subject to any disclaimer, the term of this patent is extended or adjusted under 35 U.S.C. 154(b) by 547 days.

(21) Appl. No.: 11/404,895

(22) Filed: Apr. 17, 2006

(65) Prior Publication Data

US 2006/0256469 A1 Nov. 16, 2006

(30) Foreign Application Priority Data

Apr. 18, 2005 (JP) ............................ P2005-120224

(51) Int. Cl.
*F16C 32/06* (2006.01)

(52) U.S. Cl. ....................................... 384/107; 384/121

(58) Field of Classification Search ................. 384/100, 384/107–123; 360/99.08, 98.07; 403/276, 403/282, 274
See application file for complete search history.

(56) References Cited

U.S. PATENT DOCUMENTS

| | | | |
|---|---|---|---|
| 6,505,970 B2* | 1/2003 | Takahashi et al. | 384/123 |
| 6,851,860 B2* | 2/2005 | Oelsch | 384/107 |
| 7,102,851 B2* | 9/2006 | Asada et al. | 360/99.08 |
| 2004/0071504 A1* | 4/2004 | Harada | 403/274 |
| 2004/0081377 A1* | 4/2004 | Hoffmann et al. | 384/107 |

FOREIGN PATENT DOCUMENTS

| JP | 2004-204916 | 7/2004 |
|---|---|---|
| WO | WO 2004094848 A1 * | 11/2004 |

* cited by examiner

*Primary Examiner*—Thomas R Hannon
(74) *Attorney, Agent, or Firm*—Wenderoth, Lind & Ponack L.L.P.

(57) ABSTRACT

The present invention aims to improve the efficiency of a clamping step for combining a flange with a shaft and to improve productivity. The shaft and the flange are tentatively combined in the tentative clamping step. In the tentative clamping step, a concave part at the end of the shaft is pressurized by a metal mold such as a ball to be enlarged in an outer circumferential direction, thereby pressurizing this concave part against the inner circumference of the flange so as to fix the concave part. The combined body made by tentatively combining the shaft and the flange is strongly combined in a proper clamping step. In order to correct a distortion such as a warpage of the flange that has been solidly combined by the proper clamping step, sandwiching the flange by the upper and lower metals, the flange is pressurized and a flash molding is carried out.

12 Claims, 11 Drawing Sheets

HYDRODYNAMIC BEARING MEMBER AND MANUFACTURING METHOD THEREOF

BACKGROUND OF THE INVENTION

1. Field of the Invention

The present invention relates to a hydrodynamic bearing member that is used in a motor for rotatably driving a disc recording medium and a manufacturing method thereof.

2. Description of the Related Art

A hard disc drive (HDD) has an excellent function as a storage unit that can record and reproduce a large amount of data. Not only personal computers but also various kinds of home electric appliances including audio-visual products which have HDD included therein have been wide spread. A HDD requires rotating a disc at a high speed and with a high degree of accuracy and also a HDD requires a decay durability (a longer operating life) that can stand long use, which is why a spindle motor using a hydrodynamic bearing member has been used as a motor thereof.

In recent years, due to development of compact digital equipment such as a compact portable music record reproduction apparatus and a recording medium for a digital camera having a HDD incorporated, HDD are required to be further reduced in size and thickness. In order to reduce its size and thickness, it is necessary to reduce the spindle motor for rotatably driving a disc in size and thickness. A typical conventional example of such a spindle motor is shown in a sectional view in FIG. 11.

Figure 11:
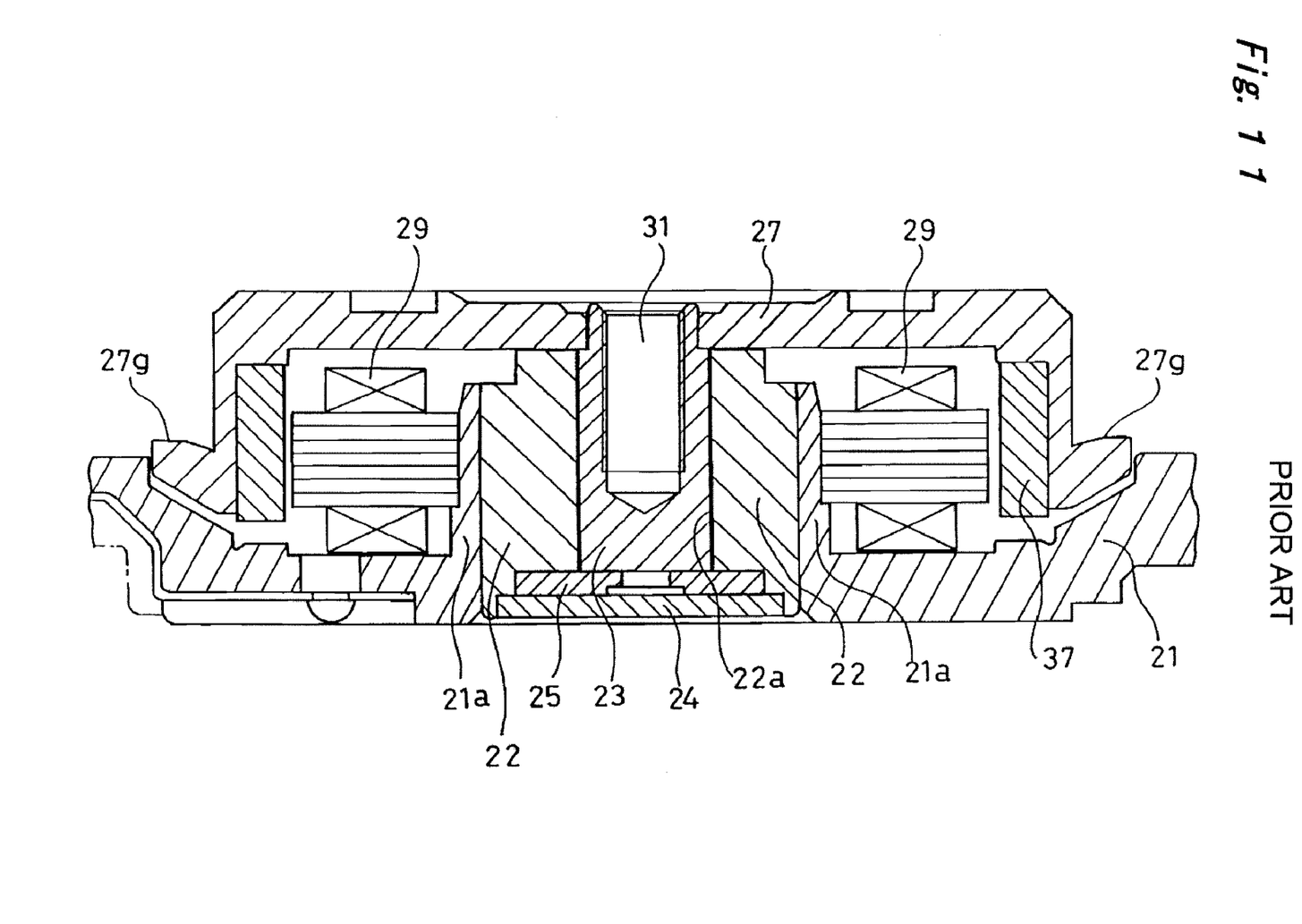
FIG. 11 is a sectional view showing the structure of a typical spindle motor having the hydrodynamic bearing member.

In FIG. 11, a housing 21 has a cylindrical part 21a at a center part, and the cylindrical part 21a is provided with a sleeve 22. In a bearing hole 22a of the sleeve 22, a shaft 23 is rotatably inserted. At the lower end of the shaft 23, a flange 25 is fitted. An opening of the lower end of the sleeve 22 is sealed by a thrust support 24. On at least one of the outer circumferential of the shaft 23 and the inner circumferential face of the bearing hole 22a, a radial dynamic pressure generation groove is disposed. In addition, on at least one of the opposed faces of the flange 25 and the thrust support 24, a thrust dynamic pressure generation groove is disposed. Between the shaft 23 and the sleeve 22 and between the thrust support 24 and the flange 25, fluid such as oil is loaded so as to compose a hydrodynamic bearing that is well known in the art.

By way of example, the following materials are used as a material of each part. As the housing 21, an aluminum die cast material or an iron material is used, and as the sleeve 22, a material obtained by nickel-plating a brass material (a copper alloy) is used. As the shaft 23, a stainless steel material (for example, SUS420J2) is used, and as the flange 25, a stainless steel material (for example, SUS304) is used. Further, as the thrust support 24, a stainless steel material (for example, SUS420J2) is used, and as the hub 27, a stainless steel material (for example, DHS1) or an aluminum material is used.

On the upper end portion of the shaft 23, the hub 27 is fitted. At the center part of the shaft 23, a screw hole 31 disposed in parallel with the axial direction of the shaft 23 is formed. By screwing a screw (its illustration is herein omitted) into the screw hole 31 and fixing a clamp member (its illustration is herein omitted), a magnetic disc or the like to be fitted to a disc support face 27g at the outer circumferential part of the hub 27 is held. On the inside of the hub 27, a rotor magnet 37 is provided. A stator core 29 with a coil wounded threaround is fitted to the housing 21 so as to oppose the rotor magnet 37.

When the current is applied to the coil wound around the stator core 29, a magnetic force in a radial direction works between the stator core 29 and the rotor magnet 37, and then, receiving a driving force due to this magnetic force, the hub 27, the shaft 23, and the flange 25 are rotated without contacting the thrust support 24 and the sleeve 22.

In order to reduce noise and oscillation, the stator core 29 and the magnet 37 are arranged with the magnetic center position in each axial direction misaligned so as to generate a magnetic attraction force in the axial direction. In place of this structure, arranging a ring-type suction plate in the housing 21 just below a magnet 37 (not illustrated in FIG. 11), the attraction force in the axial direction may be generated in the hub 27.

As compared to a hard disk drive incorporated in a common personal computer, the compact hard disk drive for the above-described use has many opportunities to turn on and off, and on each occasion, the motor of the hard disk drive activates and stops. Upon the activation and the stop of the motor, a force is added to a connection part between the shaft 23 and the flange 25 in the hydrodynamic bearing incorporated in such a motor. In addition, high impact may occur when the motor is dropped on a floor during use. Therefore, it is especially needed to set the connection intensity of the shaft 23 and the flange 25 sufficiently high.

As a conventional method to connect the shaft and the flange, there is a "press work method" shown in the JP-A No. 2004-204916. According to the press work method, a circular flange member having a shaft mounting hole at its center and a shaft to be inserted in the shaft mounting hole have been manufactured as a component in advance. The shaft and the flange member are connected in the following respective steps.

Step (1):

A concave mold (a metal mold) having a hole for inserting a shaft at its center and having an inner diameter that is slightly larger than an outer diameter of a flange member is mounted on a pressing machine, and in the hole of this concave mold, a shaft is loaded (hereinafter, in place of "load", "set" is used).

Step (2):

Inserting the end of the shaft in the shaft mounting hole of the flange member, the flange member is set in the concave mold. There is a minute gap between the outer circumferential face of the flange member and the inner circumferential face of the concave mold, however, the outer circumferential face of the flange member is bound substantially by the inner circumferential face of the concave mold. The concave mold moving being opposed to the concave mold is fitted to the pressing machine so as to add a predetermined press pressure on the face of the flange member. For example, at least one of the bottom face of the concave mold and the surface of a convex mold has a whorl-like groove in order to form the thrust dynamic pressure generation groove on the opposite surfaces or one surface of the flange member.

Step (3):

Operating the pressing machine, the opposite surfaces of the flange member are sandwiched by the concave mold and the convex mold to apply pressure thereto (a pressure step). During the pressure step, the thrust dynamic pressure generation groove is formed on the opposite surfaces or one surface of the flange member.

During this pressure step, the flange member having the opposite surfaces compressed intends to stretch in the outer circumferential direction; however, the outer circumferential face is bound by the concave mold and this makes the flange member stretch toward the shaft mounting hole. As a result, the diameter of the shaft mounting hole is decreased (hereinafter, referred to as a contraction of a diameter) to be fastened by the shaft.

Step (4):

The shaft whereby the flange member is fixed is detached from the concave mold.

The flange member fastened by the shaft has a distortion (a warpage) generated in the pressure step and the warpage is corrected in the next step (a correcting step).

Step (5):

In the correction step, a flange mounted on the shaft is set between two flat metal molds having flat faces.

Step (6):

Closing two flat metal molds, the opposite surfaces of the flange are pressurized to carry out flash molding.

Step (7):

The flange is detached from the flat metal mold.

By the steps (1) to (7), the shaft having the flange member mounted thereon is manufactured. The steps (1) to (4) are referred to as "a compression molding step", and the steps (5) to (7) are referred to as "a flash molding step". Further, the shaft having the flange member mounted thereon will be called "a hydrodynamic bearing member".

In the manufacturing step of the conventional hydrodynamic bearing member, at least steps (1) and (2) are carried out by the manual operations by a worker. Therefore, a necessary time of the steps (1) and (2) largely depends on the skill of the worker. In addition, when the flange member is set in the concave mold in the step (2), the flange member may not be set accurately. For example, the edge of the flange member may be set overlapping the edge of the concave mold. This involves a problem that an expensive concave mold and convex mold are damaged and they cannot be used if the concave mold and the convex mold are closed in this state.

The compression molding steps (1) to (4) and the flash molding steps (5) to (7) have different working hours (the tact hour). In other words, normally, the working hours of the compression molding step is longer. Therefore, both steps cannot progress in parallel and it is difficult to improve productivity. As a result, it is difficult to decrease a manufacturing cost thereof.

SUMMARY OF THE INVENTION

The present invention has been made taking the foregoing problems into consideration and an object of which is to provide a high-grade hydrodynamic bearing member at a low cost and a manufacturing method thereof.

A hydrodynamic bearing member according to the present invention may comprise a shaft having a step part with a surface that is approximately perpendicular to a center axis of a column-shaped member formed at one end of the column-shaped member, and a mounting part having a diameter larger than the minimum diameter of the step part and forming a concave part on the end face; and a flange shaped in a disc having a hole into which the mounting part of the shaft is inserted; wherein one surface of the flange abuts against the step part of the shaft, and the shaft and the flange are combined by the clamping processing.

According to this invention, since one surface of the flange abuts against the step part of the shaft, the flange is mounted on the shaft at a correct angle. Since the flange is mounted on the shaft by the clamping processing, the inner circumferential part of the hole on the flange bites into the step part of the shaft, and the shaft and the flange are solidly attached with each other.

A manufacturing method of a hydrodynamic bearing member according to the present invention comprises a tentative clamping step of inserting a mounting part of the shaft into a hole of the flange, pressurizing the concave part of the shaft by a metal mold formed in a certain shape to enlarge the mounting part, and tentatively combining the flange with the shaft; a proper clamping step of pressurizing the opposite faces of the flange by the metal mold while binding the outer circumference of the flange and making the inner circumferential part of the hole of the flange to bite into the step part of the shaft to clamp the flange with the shaft in the flange and the shaft that were tentatively combined in the tentative clamping step; and a flash molding step of correcting a distortion of the flange by pressurizing the opposite faces of the flange; wherein the hydrodynamic bearing member comprises a shaft having a step part with a surface that is approximately vertical to a center axis of a column-shaped member formed at one end of the column-shaped member, and a mounting part having a diameter larger than the minimum diameter of the step part and forming a concave part on the end face; and a flange shaped in a disc having a hole into which the mounting part of the shaft is inserted.

According to this invention, by tentatively attached the shaft and the flange with each other in a tentative clamping step, in the following proper clamping step, it becomes very easy to treat the shaft and the flange in a step of loading the shaft and the flange in the metal mold for the proper clamping step. The tentatively clamped shaft and flange are solidly attached in the proper clamping step. A hydrodynamic bearing device can be appropriately made by using this hydrodynamic bearing member. Moreover, a spindle motor can be made appropriately by using this hydrodynamic bearing device.

According to the present invention, in the step of connecting the shaft and the flange, which are component parts of a hydrodynamic bearing, each other, the shaft and the flange have been previously made into one unit in the tentative clamping step. The metal mold in the tentative clamping step is easily composed and the operation to set the shaft and the flange in the metal mold is simple. Since the shaft and the flange that are made into one unit by the tentative clamping can be easily treated, they can be easily set in a slightly-complex metal mold used in the proper clamping step. Therefore, it is possible to prevent the shaft and the flange from being set in the metal mold by mistake and damage to the metal mold can be prevented. Moreover, by applying the member to a hydrodynamic bearing, the hydrodynamic bearing with excellent productivity and high reliability is obtained. In addition, by applying this hydrodynamic bearing to a spindle motor, the spindle motor with high reliability is obtained.

BRIEF DESCRIPTION OF THE DRAWINGS

FIG. 9 (a) is a perspective view of a front end of the upper metal mold that is used for the tentative clamping step of the second embodiment according to the present invention;

FIG. 9 (b) is a perspective view of a front end of the other example of the upper metal mold that is used for the tentative clamping step of the second embodiment according to the present invention;

DESCRIPTION OF THE PREFERRED EMBODIMENTS

The preferred embodiments of a hydrodynamic bearing member and a manufacturing method thereof according to the present invention will be described below with reference to FIGS. 1 to 9. The "hydrodynamic bearing member" means a member in which a shaft serving as a radial bearing and a flange serving as a thrust bearing which are main components of hydrodynamic bearing have been combined into one unit.

The hydrodynamic bearing member according to the first embodiment of the present invention will be described with reference to FIGS. 1 to 7.

Figure 1:
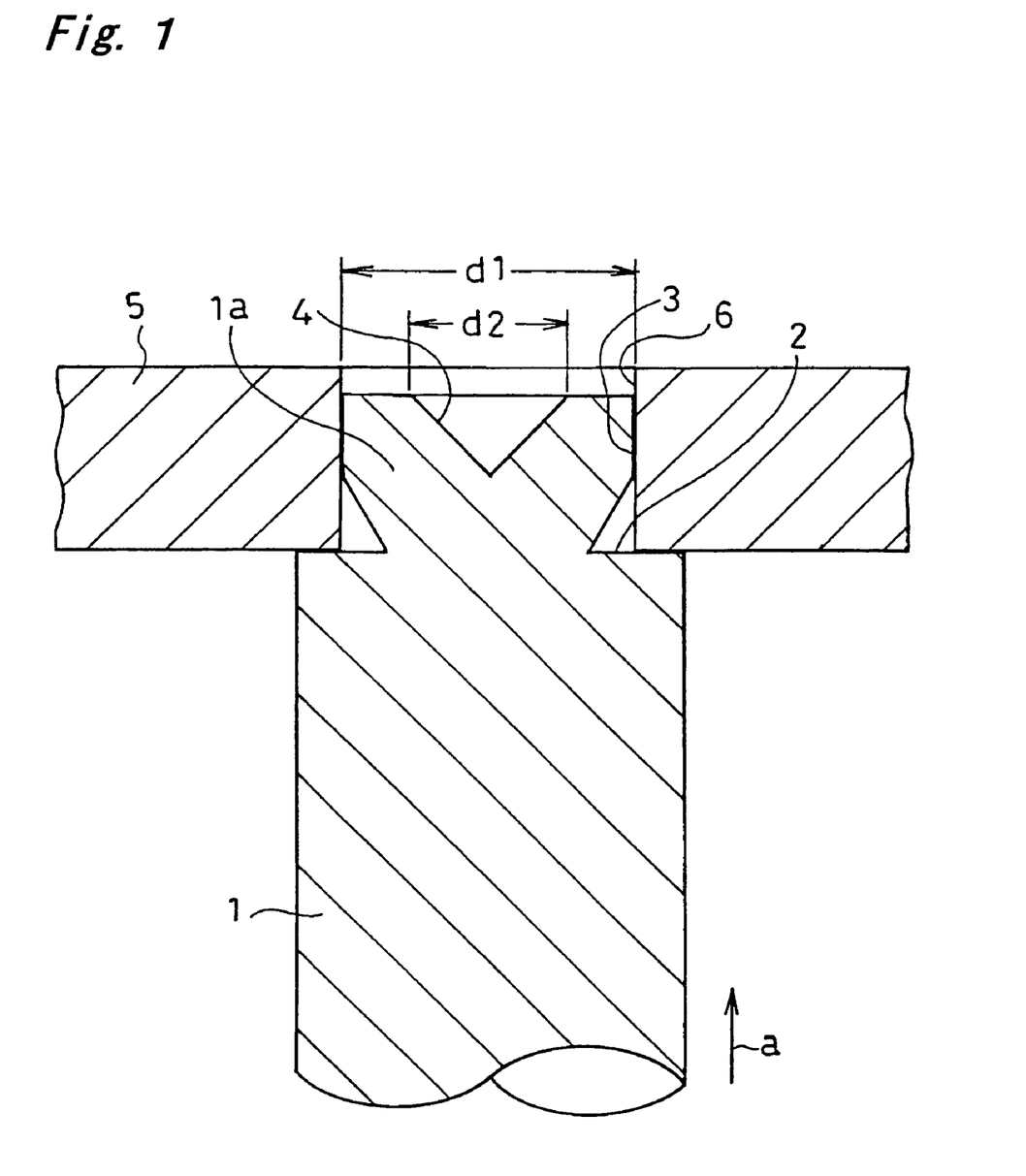
FIG. 1 is a sectional view showing the state that a shaft and a flange, which are components of a hydrodynamic bearing member, according to a first embodiment of the present invention are combined.

FIG. 1 is a partial sectional view of a hydrodynamic bearing member of the first embodiment showing the state that a shaft 1 and a flange 5 are combined. The shaft 1 is a column-shaped member having an annular step part 2 having a face approximately vertical to a center axis of the shaft 1 is formed at one end 1a, and the shaft 1 is made of a metal material of a stainless steel such as SUS420. A mounting part 3 of the shaft 1 is formed in the shape of a circular cylinder having a face larger than the smallest diameter of the step part 2 and being parallel to the axial direction (an arrow a) of the shaft 1. On the center part of the mounting part 3, for example, a concave part 4 having a section shaped in a cone, a truncated cone or a mortar is formed. At the lower end of the shaft, a narrow diameter part 1e is formed.

The flange 5 is a disc member having a shaft mounting hole 6 for mounting the shaft at the center and the flange 5 is made of a metal material of a stainless steel such as SUS304. Fit of the mounting part 3 and the shaft mounting hole 6 may be loose to the extent that the mounting part 3 can be easily inserted in the shaft mounting hole 6.

The manufacturing step of coupling the shaft 1 and the flange 5 shown in FIG. 1 will be described below with reference to FIGS. 2 to 7. The manufacturing step of the present embodiment 1 is composed of (A) a tentative clamping step, (B) a proper clamping step, and (C) a flash clamping step. The "tentative clamping" means tentatively coupling the shaft 1 and the flange 5, and this step is referred to as the "tentative clamping step". The description of a specific example of the tentative clamping step is as follows. In the case that a diameter d1 of the mounting part 3 is about 1.9 mm and a diameter d2 of the concave part 4 is about 1.2 mm, a clamping metal mold 9 having a ball with a diameter 3 mm or a front end 9a shaped in a ball is moved in a direction indicated by an arrow 9b to add a pressure of about 250 kgf.

The "proper clamping step" is a step of solidly fixing the shaft 1 and the flange 5. The "flash molding step" is a step of correcting a distortion such as a warpage of the flange.

The tentatively clamped shaft 1 and flange 5 are referred to as "a tentative clamping bearing support 10".

Figure 2:
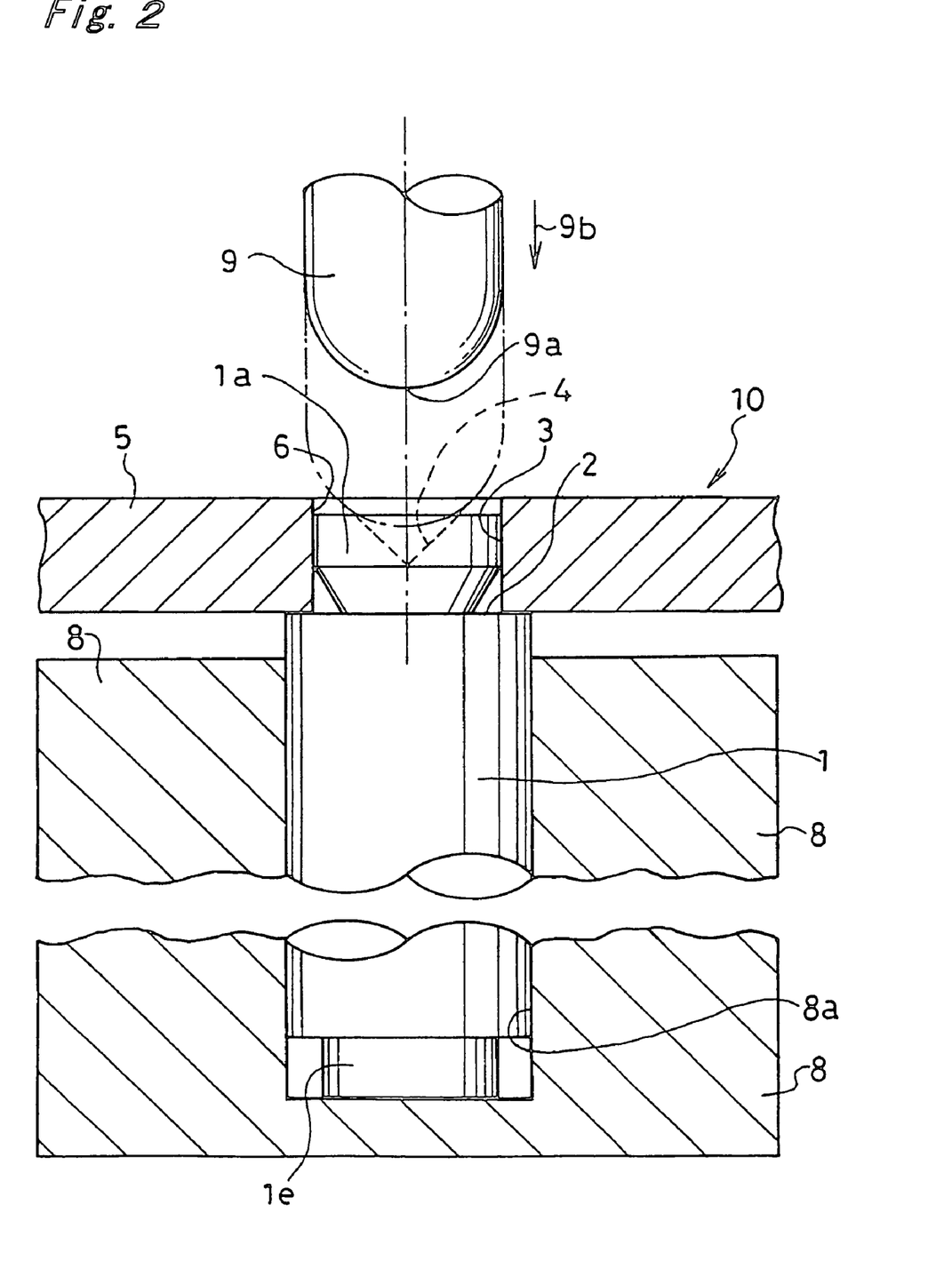
FIG. 2 is a sectional view showing a tentative clamping step of the shaft and the flange that are combined in FIG. 1.

In FIG. 2, a fixing jig 8 and the clamping metal mold 9 are mounted on a pressing machine (not illustrated), and in operation, the clamping metal mold 9 is moved to the direction indicated by the arrow 9b.

(A) Tentative Clamping Step

Step (A1): By the manual operation, the shaft 1 is inserted in a hole 8a of a fixing jig 8 with its end 1a turned up.

Step (A2): The mounting part 3 of the shaft 1 is inserted in the shaft mounting hole 6 of the flange 5.

Step (A3): Operating the pressing machine, the concave part 4 of the shaft 1 is pressed or struck at the ball of the clamping metal mold 9 or the front end 9a shaped in the ball. The diameter of the ball-shaped part of the front end 9a is preferably large to the extent that the sphere face of this ball-shaped part contacts the diameter (d2 in FIG. 1) of the upper face of the concave part 4. As a result, the concave part 4 is opened outside and in accordance with this, the mounting part 3 is opened outside. Further, as a result, the mounting part 3 may compress the inner face of the shaft mounting hole 6 and the shaft 1 is "tentatively clamped" by the flange 5.

Step (4a): The tentatively clamped bearing support 10 is detached from the jig 8 to be kept in a predetermined container.

(B) Proper Clamping Step

Figure 3:
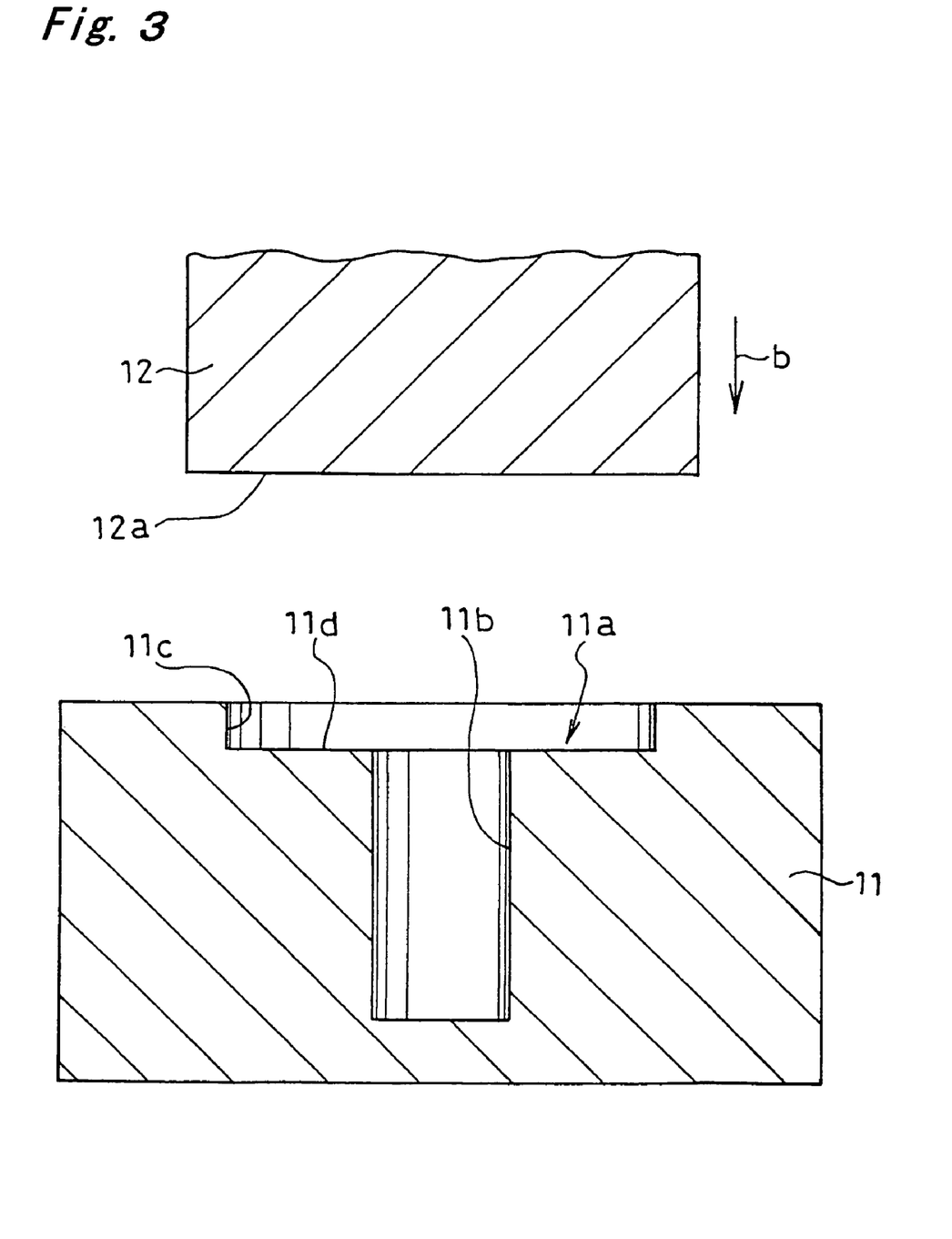
FIG. 3 is a sectional view of an upper metal mold and a lower metal mold for carrying out proper clamping of a tentative clamping bearing support 10 that was tentatively clamped in a tentative clamping step.

The proper clamping step of the tentatively clamped bearing support 10 will be described with reference to the sectional views from FIG. 3 to FIG. 5. FIG. 3 is a side sectional view only showing a metal mold of a pressing machine (not illustrated) used in the proper clamping step.

In the drawing, both of a lower metal mold 11 and an upper metal mold 12 are mounted on the pressing machine that has been well known generally, and in press working, for example, the upper metal mold 12 is moved in the direction indicated by an arrow b to carry out the press working.

The lower metal mold 11 has a concave part 11a on the upper face and has a hole 11b on the center of the concave part 11a. A depth of the concave part 11a, namely, a height of a side face 11c is made to be slightly lower than the thickness of the flange 5. On a bottom face 1d of the concave part 11a, a molding tool for forming a thrust dynamic pressure generation groove is disposed on the lower face of the flange 5 in FIG. 1, however, there is a case that this is not disposed. The diameter of the side face 11c of the concave part 11a is made to be slightly larger than that of the flange 5 so that the flange 5 can be easily inserted in the concave part 11a.

On a lower face 12a of an upper metal mold 12, a molding tool for the thrust dynamic pressure generation groove is disposed.

Figure 4:
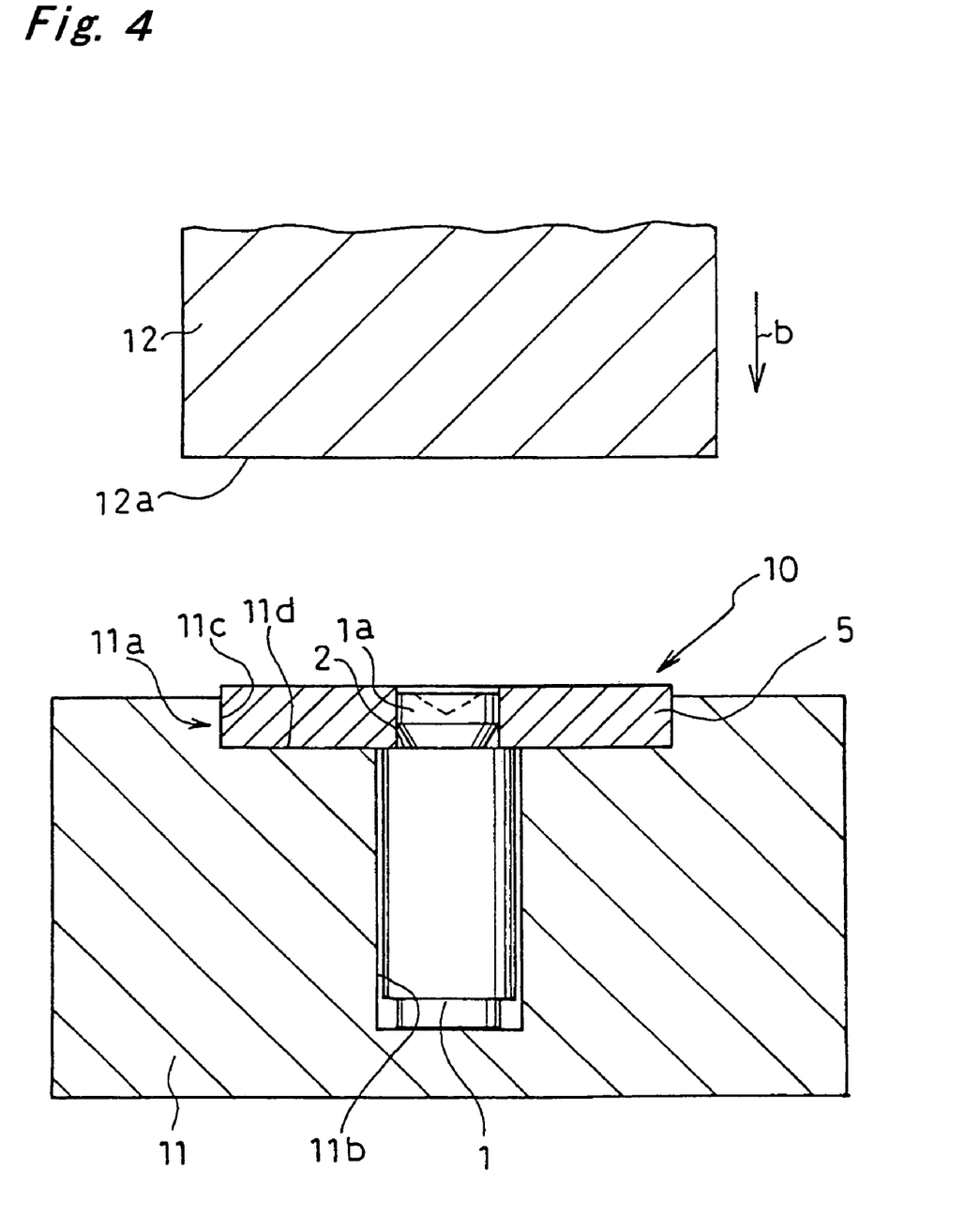
FIG. 4 is a sectional view of upper and lower metal molds showing the state just before the proper clamping step that the tentative clamping bearing support 10 that is tentatively clamped is loaded in the lower metal mold shown in FIG. 3.

FIG. 4 shows the state that the tentatively clamped bearing support 10 to be processed is set in the lower metal mold 11 by the manual operation or the automatic loading in a step (B1) of the proper clamping step. In the drawing, the shaft 1 is inserted in the hole 11b. A gap is formed between the lower end of the shaft 1 and the bottom face of the hole 11b of the lower metal mold 11, and this gap is set to be at a larger value than the height of the mold of the thrust dynamic pressure generation groove formed on the bottom face 11d of the lower metal mold 11.

Figure 5:
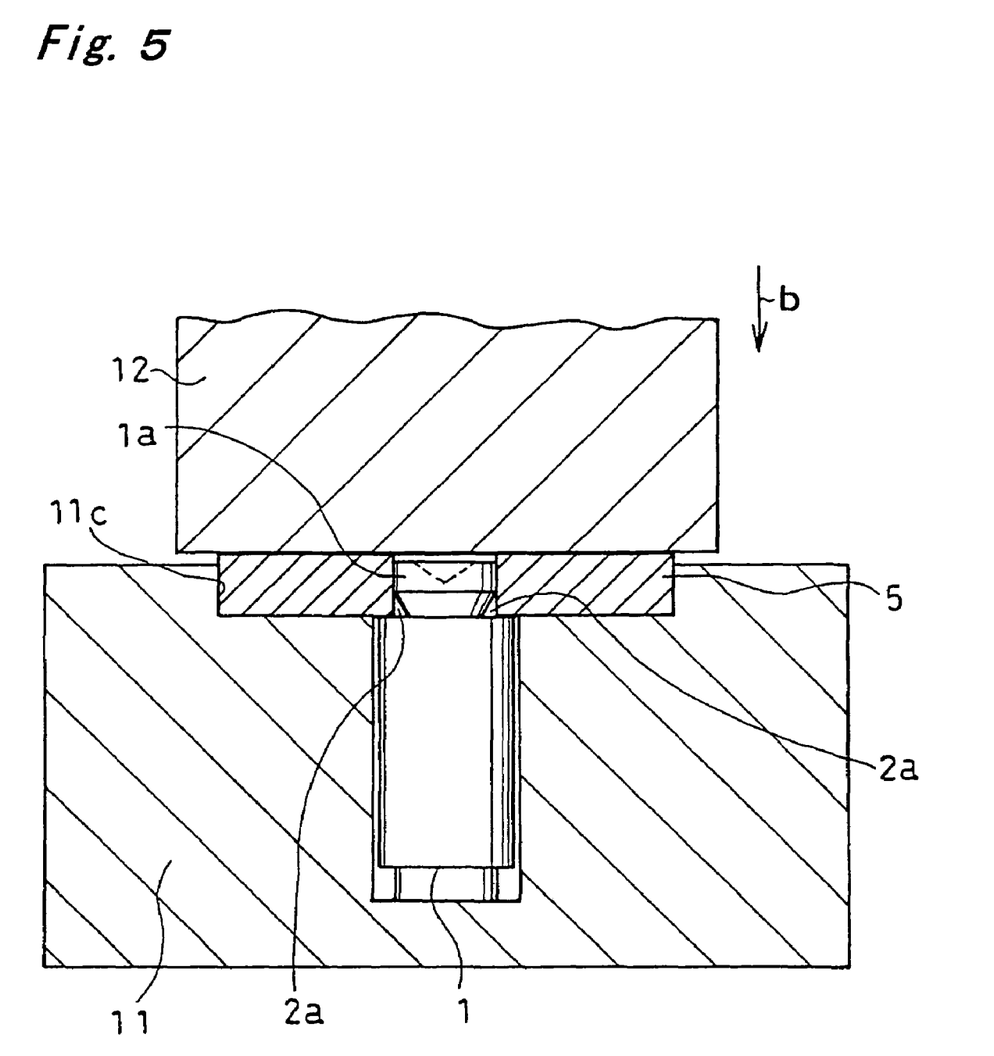
FIG. 5 is a sectional view of upper and lower metal molds showing the proper clamping step.

In a step (B2), causing the upper metal mold 12 to decline as shown in FIG. 5, the upper face of the flange 5 is pressed to carry out the proper clamping. Thereby, the thrust dynamic pressure generation groove is formed on the upper and lower faces of the flange 5 and the flange 5 is crushed to attempt to stretch in a direction along the face. Since the outer circumference of the flange 5 is bound by the side face 11c of the concave part 11a of the lower metal mold 11, the flange 5 cannot stretch to the direction of the outer circumference. Therefore, the lower end of the inner circumference of the flange 5 stretches toward a gap 2a between the step part 2 of the shaft 1 and the flange 5 to bite into the gap 2a. As a result, the shaft 1 and the flange 5 are strongly combined. According to this proper clamping step, even if the face of the step part 2 of the shaft 1 is not at a right angle to the axis and has some angle errors, by modifying the flange 5 along the metal mold, the right angle of the face of the flange 2 is processed in a desired degree of accuracy by the metal mold. Therefore, this has an advantage such that a degree of accuracy of a completed product is not largely affected even if there are some errors in the size of the component.

A specific example is set forth as follows. For example, in the case that a diameter d3 of a small diameter part is about 1.9 mm, a diameter d4 of the concave part 4 is about 1.5 mm, and a depth d5 of the concave part is 0.6 mm in FIG. 6, a welding force of the pressing machine is about 4 to 5 tons.

It is assumed that a combined body made by the shaft 1 and the flange 5, for which a proper clamping step has been completed, is referred to as "a proper clamped bearing 10a".

Figure 6:
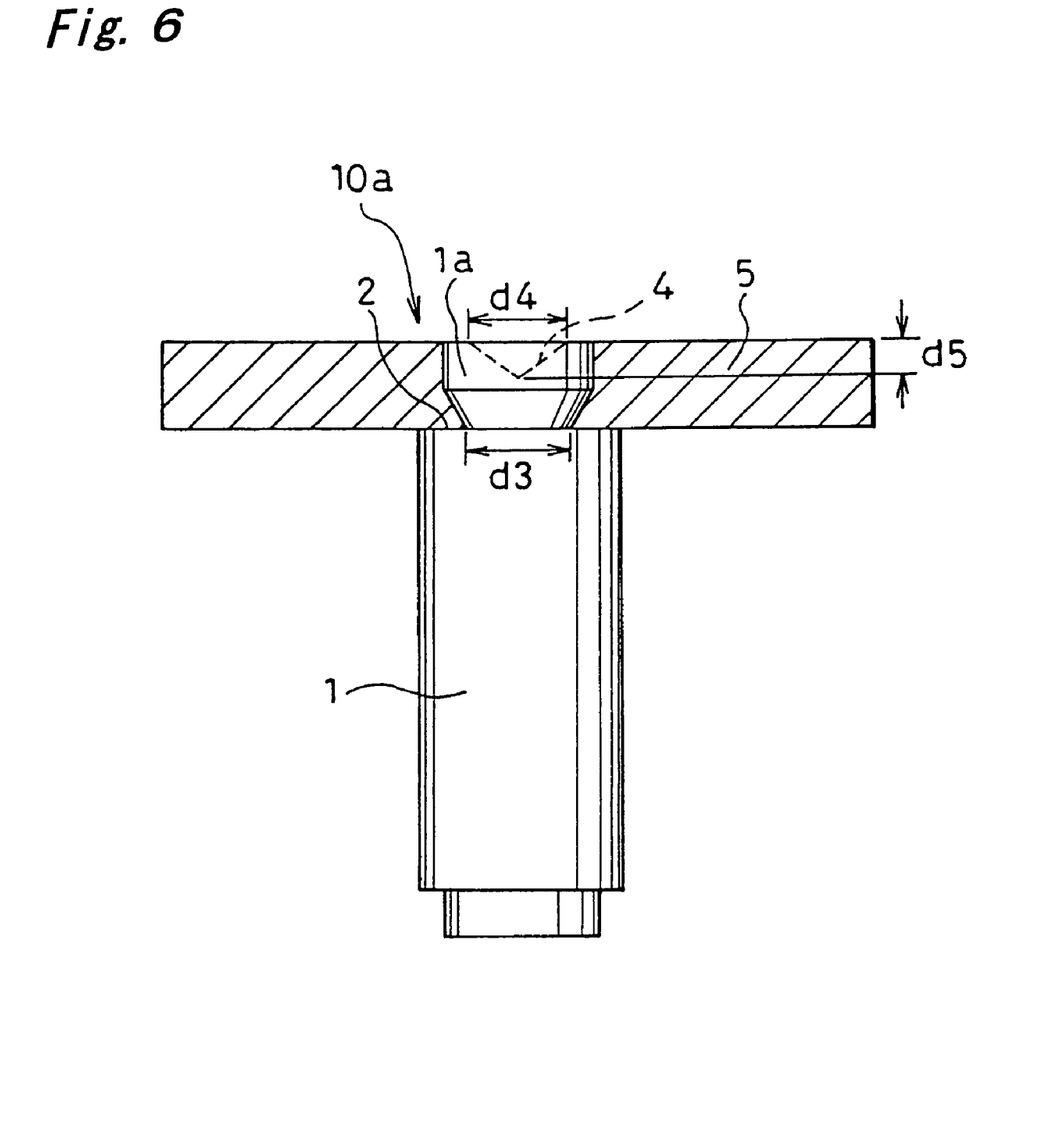
FIG. 6 is a sectional view of a bearing member that the proper clamping step has been completed.

In a step (B3), the proper clamped bearing 10a is detached from the lower metal mold 11. FIG. 6 is a partial sectional view of the completed proper clamped bearing 10a. As shown in the drawing, the inner circumferential part of the flange 5 throws out at the step part 2 of the shaft (this may be referred to as a contraction of a diameter) to bite into the concave part formed on the step part 2 of an end a of the shaft 1.

(C) Flash Molding Step

Figure 7:
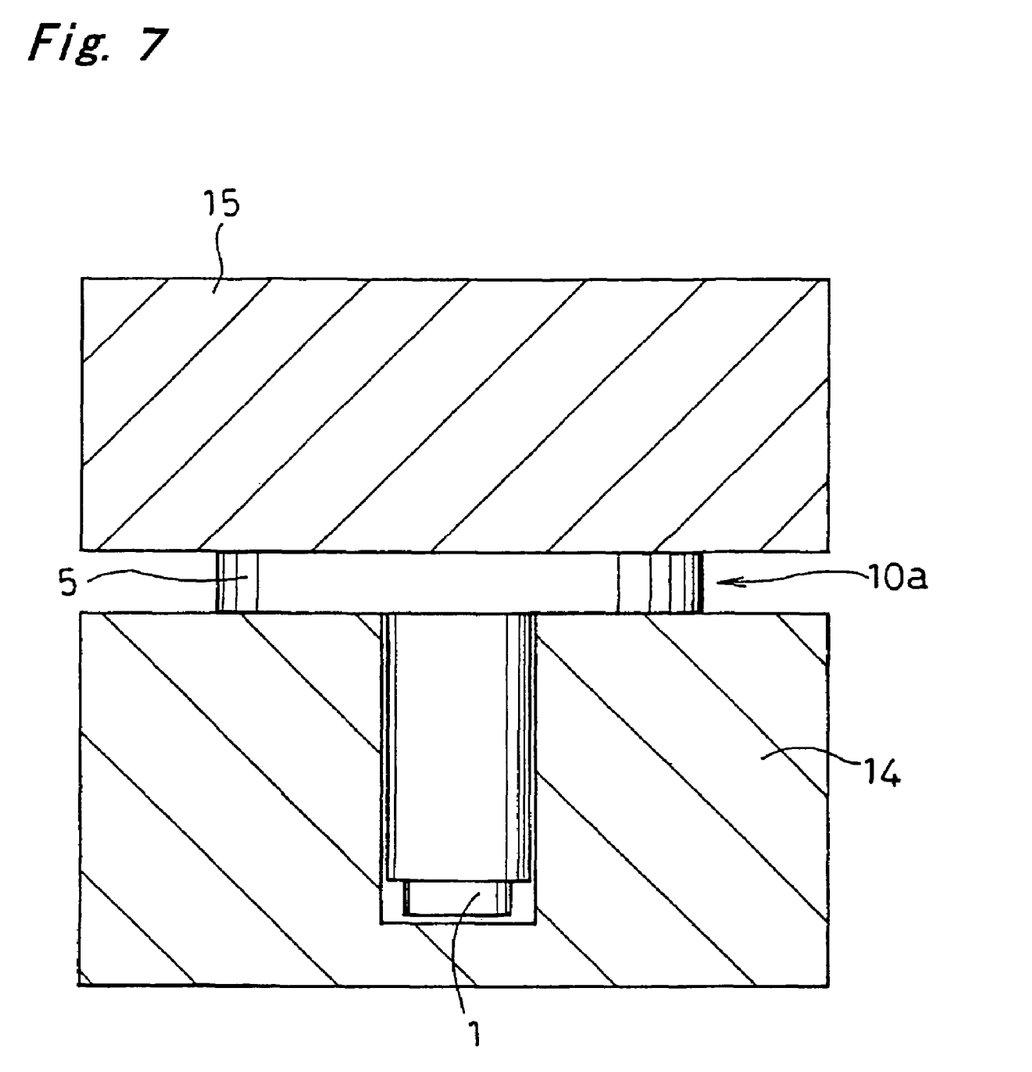
FIG. 7 is a sectional view of upper and lower metal molds showing a flash molding step for correcting a warpage of the flange.

In a step (C1), the proper clamped bearing 10a is set in a lower metal mold 14 and an upper metal mold 15 mounted on the other pressing machines shown in FIG. 7.

In a step (C2), causing the upper metal mold 14 to decline as shown in FIG. 7 so as to pressurize the flange 5 and sandwich the flange 5, the flash clamping is carried out so as to correct the warpage of the flange 5.

In a step (C3), the proper clamping bearing 10a that was flash-molded is detached from the lower metal mold 14.

According to the above-described respective steps, the completed hydrodynamic bearing member can be obtained.

According to the manufacturing method of the first embodiment, it is possible to make the necessary time of the step (A) from the step (A1) to the step (A3), the necessary time of the step (B) from the step (B1) to the step (B3), and the necessary time of the step (C) from the step (C1) to the step (C3) can be made approximately the same. Therefore, when carrying out the steps A, B, and C in parallel, "waiting" is not generated so often in the all manufacturing steps from the step (A) to the step (C) and this leads to the improvement of a productivity. In addition, by providing the tentative clamping step, "the tentative clamped bearing support 10" that was tentatively-clamped can be easily treated. In the proper clamping step shown in FIGS. 4 to 5, the tentative clamped bearing support 10 can be normally loaded in the lower metal mold 11 without fail and there is no fear to damage the lower metal mold 11 and the upper metal mold 12 due to the error loading. In the proper clamping state shown in FIG. 4, it becomes easy to automatically load the tentative clamped bearing support 10 in the lower metal mold 11 by using a part feeder or a robot for an industry or the like, so that the productivity thereof can be largely improved. Further, the cost can be largely decreased.

The hydrodynamic bearing member according to the second embodiment of the present invention will be described with reference to FIG. 8 and FIG. 9. In the present embodiment, the shape of the end of the shaft 18 is different from the shaft 1 of the embodiment 1. The shape and the structure of the flange are substantially the same as those of the first embodiment.

Figure 8:
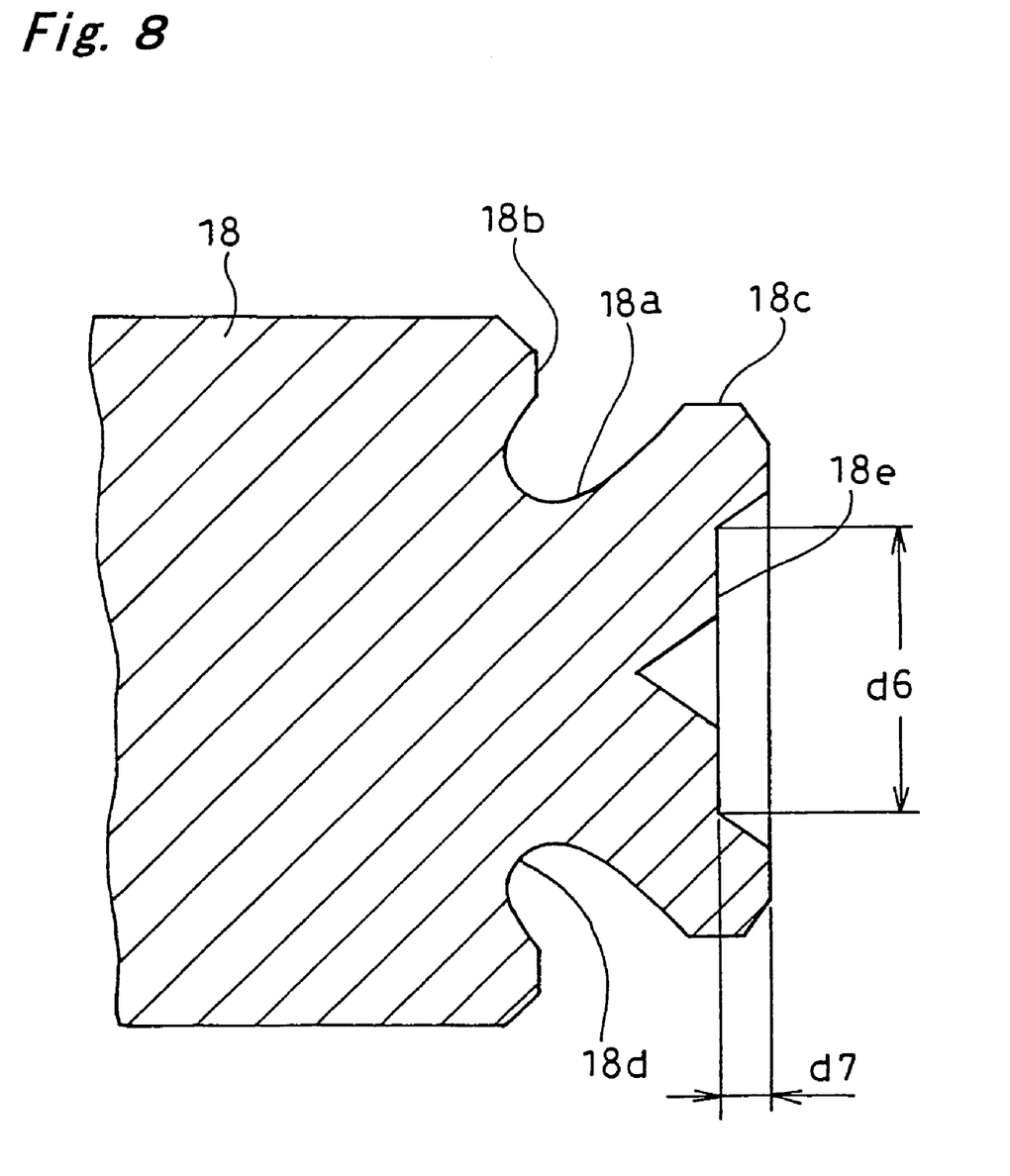
FIG. 8 is a sectional view of a part of a shaft of a hydrodynamic bearing member according to a second embodiment of the present invention.

FIG. 8 is a sectional view of the end of the shaft 18 according to the second embodiment. In the drawing, the shaft 18 has a small diameter part 18a and a step part 18b at the right end of the column-shaped member. A roll off 18d of which diameter is smaller than that of the small diameter part 18a is formed between the small diameter part 18a and the step part 18b. At the right end of the shaft 18, a mounting part 18c of which diameter is larger than that of the small diameter part 18a is formed. On the right end face of the shaft 18, a concave part 18e is formed. The side wall of the concave part 18e has a slope that the diameter thereof is gradually enlarged from a bottom part diameter d6 to the right end of the shaft. The size of each part of the shaft 18 according to the specific example is as follows. The diameter of the shaft 18 is 2.4 mm, the diameter of the small diameter part 18a is 1.5 mm, the diameter of the mounting part 18c is 1.9 mm, the bottom part diameter d6 of the concave part 18e is 1.5 mm, and a depth d7 of the concave part 18e is 0.06 mm. On the center part of the concave part 18e, a concave part shaped in a cone, a truncated cone or a column may be formed.

Figure 9:
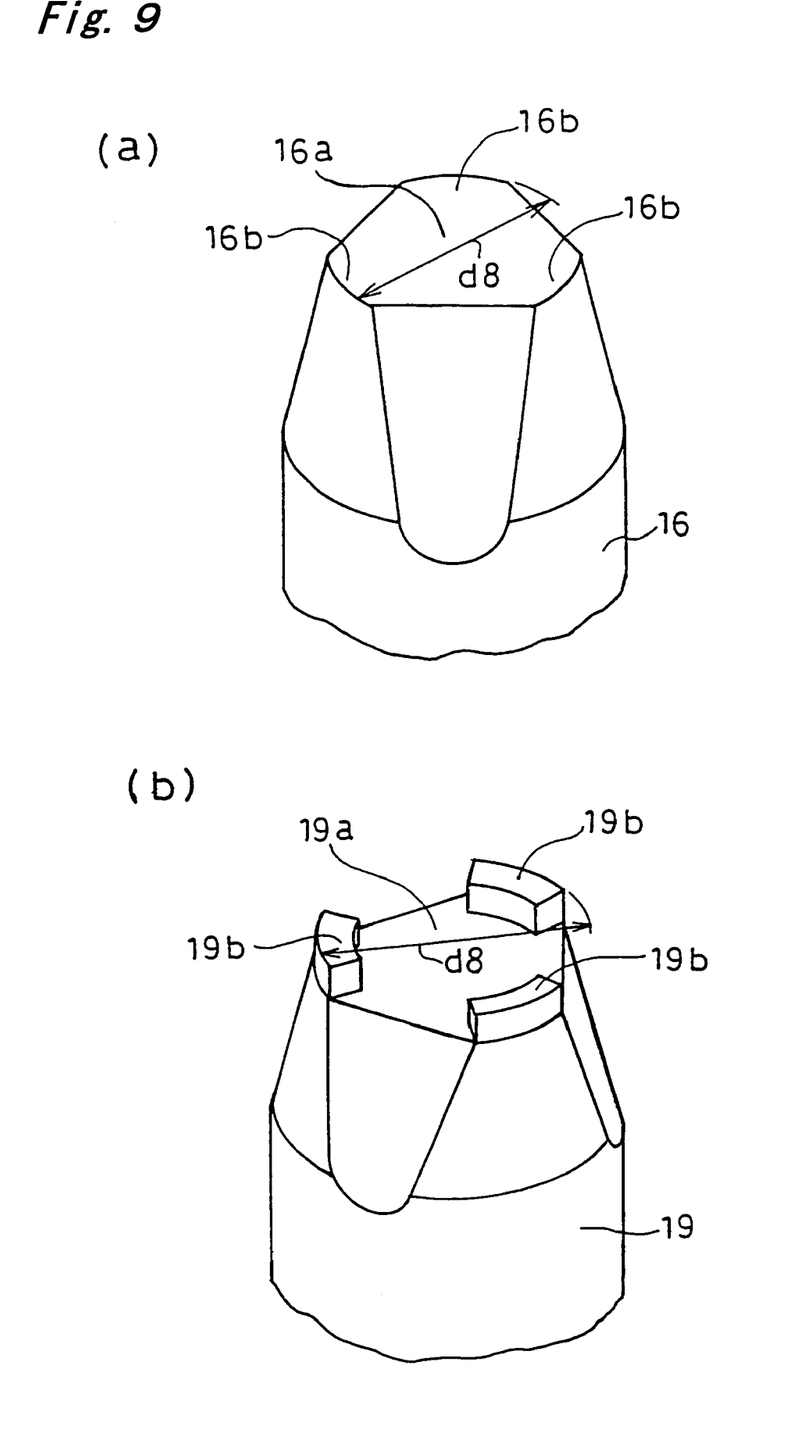

In the case of tentatively clamping this shaft 18 into the flange 5, by using clamping metal mold 16 or 19 having three projections shown in FIG. 9 (a) or FIG. 9 (b), the pressure may be added to the side wall that is enlarged outside of the concave part 18e or the side wall and the end face.

FIGS. 9 (a) and 9 (b) are perspective views of the front ends of the clamping metal molds 16 and 19 that are used in the tentative clamping step, respectively. In the clamping metal mold shown in FIG. 9 (a), a flat part 16a approximately in a triangle shape is formed at the front end, and three angles of the triangle compose a projection part 16b. FIG. 9 (b) is a perspective view of the front end of the clamping metal mold 19 according to the other example. The clamping metal mold 19 shown in FIG. 9 (b) has three projections 19b shaped in a circular arc at the front end. The height from an end face 19a of a projection 19b is about 0.5 to 1.0 mm. A diameter d8 of a circle enclosing the outer circumferences of three projections 16b or three projections 19b is defined to be larger than the bottom part diameter d6 of the concave part 18e and be smaller than the diameter of the mounting part 18c. The clamping metal mold 16 or 19 is turned upside down to be used in place of the clamping metal mold 9 shown in FIG. 2.

According to the second embodiment, in place of the clamping metal mold 9 according to the first embodiment shown in FIG. 2, the proper clamping will be carried out by using this clamping metal mold 16. Composing the pressing machine in the same way as FIG. 2 and pressurizing the concave part 18e of the shaft 18 by the clamping metal mold 16, the mounting part 18c has three parts pressed by three projection parts 16b of the clamping metal mold 16 which are enlarged to the outer circumferential direction to be pressed to the inner circumferential face of the flange 5. As a result, the mounting part 18c of the shaft 18 is fixed at three positions by the flange 5 and the tentative clamping is carried out. In the tentative clamping step, the same applies to the clamping metal mold 19.

Figure 10:
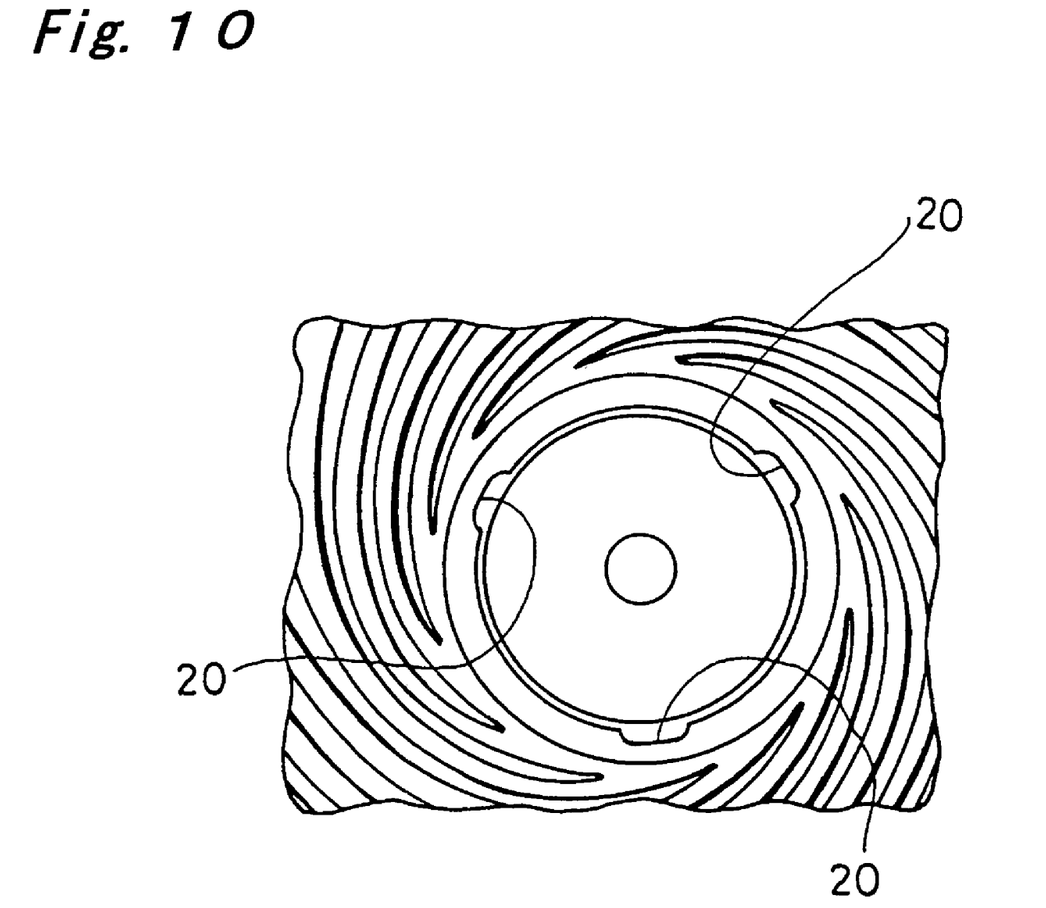
FIG. 10 is a view showing an end face of the shaft that was tentatively clamped in the second embodiment according to the present invention.

In the tentative clamping step according to the second embodiment, since three comparatively narrow parts of the mounting part 18c of the shaft 18 are enlarged to the outer circumferential direction, the welding force given to the clamping metal mold 16 in the tentative clamping step may be smaller than that of the first embodiment. Accordingly, as the pressing machine used for the tentative clamping step, a compact one can be used. In the shaft 18 shown in FIG. 8, the welding force is about 70 kgf. According to the second embodiment, the number of the projection parts 16b of the clamping metal mold 16 is three; however, this number is not limited to three and it may be smaller than three or larger than three. In the second embodiment, each step following the tentative clamping step is the same as the first embodiment. In the proper clamping step, the inner circumferential part of the flange 5 is contracted to bite into the roll off 18d of the shaft 18, and then, the flange 5 is solidly fixed to the shaft 18. FIG. 10 is a plan view showing the states of the shaft end face and the flange face after the proper clamping step in the present embodiment. As shown from the drawing, in the tentative clamping step, a concave part 20 that is formed when pressing the mounting part 18c by the clamping metal mold 16 or 19 having three projections shown in FIG. 9 (a) or FIG. 9 (b) can be seen.

By applying the hydrodynamic bearing member described in the first and second embodiments to a hydrodynamic bearing and a spindle motor including it as shown in FIG. 11, the hydrodynamic bearing device and the spindle motor with high reliability are provided.

The present invention is available for the mass production of the bearing member of the hydrodynamic bearing member.

What is claimed is:

1. A hydrodynamic bearing member comprising:
   a shaft having a column-shaped member and a mounting part extending from the column-shaped member such that a step part is formed at one end of the column-shaped member,
   the step part having a surface that is substantially perpendicular to a center axis of the column-shaped member, and
   the mounting part having a diameter larger than a minimum diameter of the step part and forming a concave part on an end face of the shaft; and
   a flange having a hole in which the mounting part of the shaft is disposed,
   wherein one surface of the flange abuts against the step part of the shaft, and the shaft and the flange are joined by a clamping process such that the concave part of the shaft is expanded radially outwardly so as to press an outer periphery of the mounting part of the shaft against an inner periphery of the hole of the flange.

2. The hydrodynamic bearing member according to claim 1,
   wherein the concave part disposed at the end face of the shaft is shaped in one of a cone shape, a truncated cone shape, and a column shape.

3. The hydrodynamic bearing member according to claim 1,
   wherein the concave part disposed at the end face of the shaft has an inner diameter that is gradually enlarged toward the end of the shaft.

4. A hydrodynamic bearing device comprising the hydrodynamic bearing member according to claim 1.

5. A spindle motor comprising the hydrodynamic bearing device according to claim 4.

6. The hydrodynamic bearing device according to claim 1, wherein the flange is disc-shaped.

7. A hydrodynamic bearing member comprising:
   a shaft having a column-shaped member and a mounting part extending from the column-shaped member such that a step part is formed at one end of the column-shaped member,
   the step part having a surface that is substantially perpendicular to a center axis of the column-shaped member, and
   the mounting part having a diameter larger than a minimum diameter of the step part and forming a concave part on an end face of the shaft; and
   a flange having a hole in which the mounting part of the shaft is disposed,
   wherein one surface of the flange abuts against the step part of the shaft, and
   wherein the shaft and the flange are joined in a clamped fit, said clamped fit being constituted by an outward pressing of the outer periphery of the mounting part against an inner periphery of the hole of the flange due to radially outward expansion of the concave part.

8. The hydrodynamic bearing member according to claim 7,
   wherein the concave part disposed at the end face of the shaft is shaped in one of a cone shape, a truncated cone shape, and a column shape.

9. The hydrodynamic bearing member according to claim 7,
   wherein the concave part disposed at the end face of the shaft has an inner diameter that is gradually enlarged toward the end of the shaft.

10. A hydrodynamic bearing device comprising the hydrodynamic bearing member according to claim 7.

11. A spindle motor comprising the hydrodynamic bearing device according to claim 10.

12. The hydrodynamic bearing device according to claim 7, wherein the flange is disc-shaped.

* * * * *